(12) United States Patent
Davis

(10) Patent No.: US 12,716,545 B2
(45) Date of Patent: Aug. 25, 2026

(54) METHODS, SYSTEMS, APPARATUSES, AND DEVICES FOR PROVIDING LEVELLING

(71) Applicant: Home Tours Pro, LLC, Brandon, MS (US)

(72) Inventor: Mark Davis, Canton, MS (US)

( * ) Notice: Subject to any disclaimer, the term of this patent is extended or adjusted under 35 U.S.C. 154(b) by 167 days.

(21) Appl. No.: 18/744,336

(22) Filed: Jun. 14, 2024

(65) Prior Publication Data

US 2024/0418310 A1 Dec. 19, 2024

Related U.S. Application Data

(60) Provisional application No. 63/508,212, filed on Jun. 14, 2023.

(51) Int. Cl.
*F16M 11/18* (2006.01)
*F16M 11/04* (2006.01)

(52) U.S. Cl.
CPC .......... *F16M 11/18* (2013.01); *F16M 11/041* (2013.01); *F16M 2200/04* (2013.01)

(58) Field of Classification Search
CPC ... F16M 11/18; F16M 11/041; F16M 2200/04
USPC ........................................................ 396/428
See application file for complete search history.

(56) References Cited

U.S. PATENT DOCUMENTS

2011/0188847 A1* 8/2011 McKay .................. F16M 11/38 396/421
2022/0003357 A1* 1/2022 Liu ...................... F16M 11/123

* cited by examiner

*Primary Examiner* — Joel W Fosselman
(74) *Attorney, Agent, or Firm* — AdamsIP, LLC

(57) ABSTRACT

The present disclosure provides an apparatus for providing levelling. Further, the apparatus may include a stand which may be configured to be stably placed on a surface. Further, the apparatus may include a gimbal comprising a holder and a handle. Further, the apparatus may include a coupling mechanism. Further, the coupling mechanism may be configured to detachably attach the handle of the gimbal to the stand. Further, the gimbal may be configured to hold an equipment, such as a digital camera. Accordingly, a still image may be obtained by attaching the gimbal to the stand even when the stand is placed on an uneven surface and a stabilized video may be obtained by detaching the gimbal from the stand.

20 Claims, 10 Drawing Sheets

METHODS, SYSTEMS, APPARATUSES, AND DEVICES FOR PROVIDING LEVELLING

REFERENCE TO RELATED APPLICATIONS

This application claims the benefit of U.S. Provisional Patent Application No. 63/508,212, titled "Methods, Systems, Apparatuses, and Devices for Providing Levelling", filed Jun. 14, 2023, which is incorporated by reference herein in its entirety.

FIELD OF DISCLOSURE

The present invention relates generally to a field of photography and optical equipment. More specifically, the present invention is methods, systems, apparatuses, and devices for providing levelling.

BACKGROUND

The field relating to photography and optical equipment is technologically important to several industries, business organizations, and/or individuals.

In the process of acquiring photos and video content for real estate, the common methods include using a leveling head, such as a ball mount, a geared head, etc., on a tripod, leveling the photography camera to the horizon, both vertically (pitch) and laterally (yaw). This achieves the desired aspect and perspective for professional photography. However, the adjustment must be redone every time the terrain or ground level shifts. Further, the operators may need to uncouple the camera from a tripod and associated mechanical leveling head and re-attach it to a gimbal stabilizer that may be either electronic or mechanical. Further, after completing shooting the video, the operators are required to re-apply the camera back to the tripod and mechanical leveling head. Existing techniques for providing stabilized platforms for photography and videography are deficient with regard to several aspects. For instance, current technologies require camera operators to change over, re-balance, or simply adjust the camera to an appropriate level as the terrain changes.

Therefore, there is a need for methods, systems, apparatuses, and devices for providing levelling that may overcome one or more of the above-mentioned problems and/or limitations.

SUMMARY OF DISCLOSURE

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

The present disclosure provides an apparatus for providing levelling. Further, the apparatus may include a stand which may be configured to be stably placed on a surface. Further, the stand includes a head portion, a stem portion, and a base portion. Further, the stem portion may be connected to each of the head portion and the base portion. Further, the base portion may be in physical contact with the surface while the stand may be placed on the surface. Further, the apparatus may include a gimbal comprising a holder and a handle. Further, the holder may be configured to hold an equipment and the handle may be configured to be held by a user. Further, the gimbal may be configured to maintain an orientation of the holder irrespective of an orientation of the handle of the gimbal in relation to a reference. Further, the apparatus may include a coupling mechanism connected to the head portion. Further, the coupling mechanism may be configured to detachably attach the handle of the gimbal to the head portion of the stand.

Further, in accordance with some embodiments, the present disclosure provides an apparatus for providing levelling. Further, the apparatus may include a tripod which may be configured to be stably placed on a surface. Further, the tripod includes a head portion, a stem portion, and a base portion. Further, the stem portion may be connected to each of the head portion and the base portion. Further, the base portion may be in physical contact with the surface while the stand may be placed on the surface. Further, the stem portion includes three legs and the base portion includes three feet corresponding to the three legs. Further, the apparatus may include an electronic gimbal comprising a holder and a handle. Further, the holder may be configured to hold an equipment and the handle may be configured to be held by a user. Further, the electronic gimbal may be configured to maintain an orientation of the holder irrespective of an orientation of the handle of the electronic gimbal in relation to a reference. Further, the apparatus may include a quick release coupling mechanism connected to the head portion. Further, the quick release coupling mechanism may be configured to detachably attach the handle of the electronic gimbal to the head portion of the stand. Further, the quick release coupling mechanism may be configured to perform each of attaching and detaching based on a user action on the quick release coupling mechanism. Further, the user action may be performable under one second.

Further, in accordance with some embodiments, the present disclosure provides an apparatus for providing levelling. Further, the apparatus may include a stand which may be configured to be stably placed on a surface. Further, the stand includes a head portion, a stem portion, and a base portion. Further, the stem portion may be connected to each of the head portion and the base portion. Further, the base portion may be in physical contact with the surface while the stand may be placed on the surface. Further, the apparatus may include a gimbal comprising a holder and a handle. Further, the holder may be configured to hold a digital camera and the handle may be configured to be held by a user. Further, the gimbal may be configured to maintain an orientation of the holder irrespective of an orientation of the handle of the gimbal in relation to a reference. Further, the apparatus may include a quick release coupling mechanism connected to the head portion. Further, the quick release coupling mechanism may be configured to detachably attach the handle of the gimbal to the head portion of the stand. Further, the quick release coupling mechanism may be configured to perform each of attaching and detaching based on a user action on the quick release coupling mechanism. Further, the user action may be performable under one second.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTIONS OF DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION OF DISCLOSURE

Figure 1:
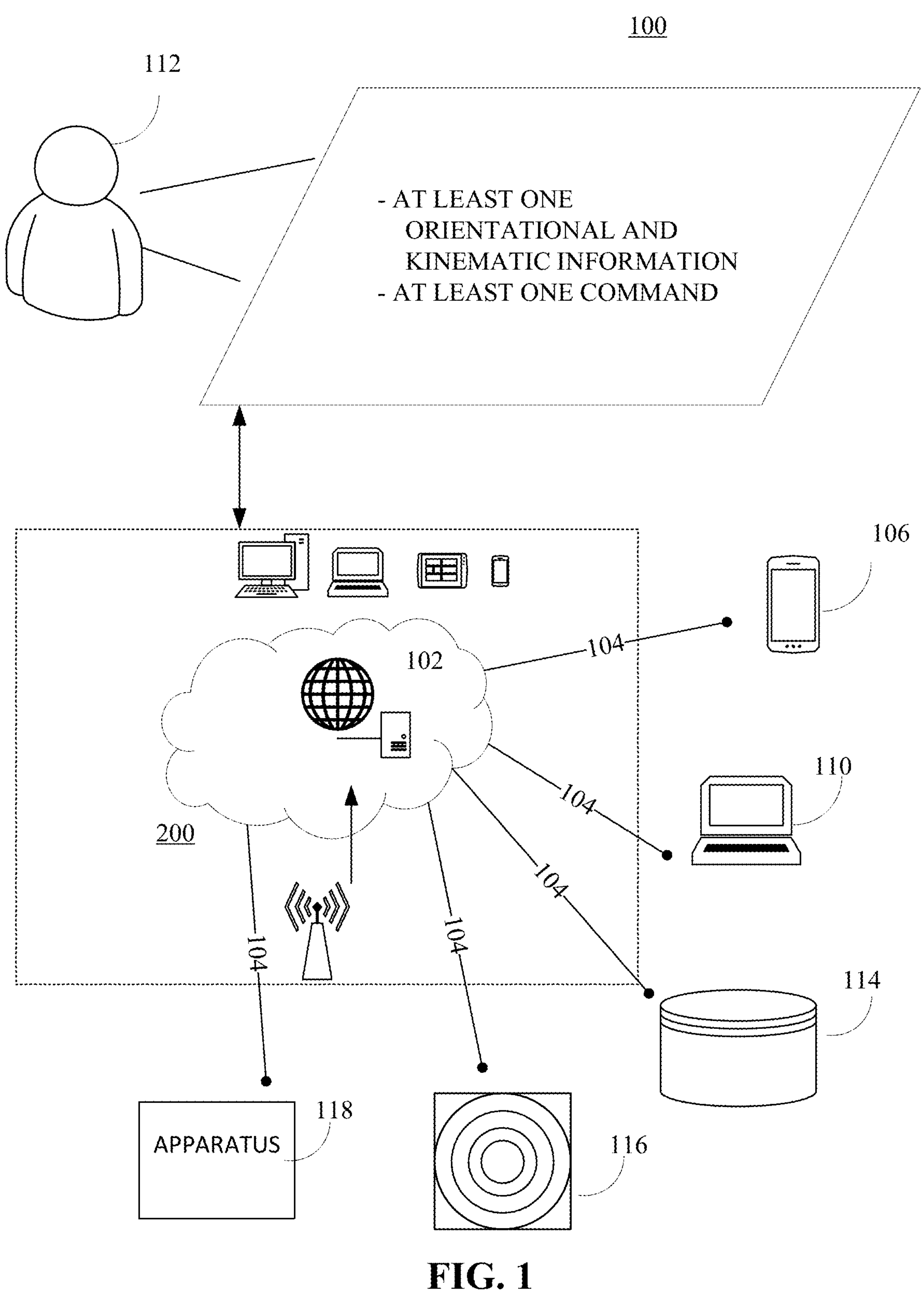
FIG. 1 is an illustration of an online platform 100 consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term-differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of the disclosed use cases, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the method disclosed herein may be initiated, maintained, controlled and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g. username, password, passphrase, PIN, secret question, secret answer etc.) and/or possession of a machine readable secret data (e.g. encryption key, decryption key, bar codes, etc.) and/or or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview

The present disclosure describes methods, systems, apparatuses, and devices for providing levelling. Further, the disclosed apparatus may be configured to eliminate re-balancing. Further, the apparatus may leverage the use of a video stabilization gimbal for use with photography. Further, the apparatus allows users to quickly place the tripod down and use the video gimbal to achieve the correct horizon perspective automatically. Further, the users may remotely trigger the photo shutter release and quickly move to a new location. This improves efficiency by more than 50% of traditional manual leveling adjustment. Secondly, with the gimbal already set up for video stabilization, the users may rapidly uncouple the gimbal from the tripod base and immediately use the gimbal to film videography of the location. The efficiency improvement may be 65+%.

Further, the users may instantaneously switch between stabilized video recording and then automatically leveled and stable photography without the need to remove a camera, re-balance, or manually adjust the perspective or horizon using a geared head or ball leveling head. So not only does this allow for the instantaneous switching to video from photo acquisition, but it also eliminates the need for the operator to re-level or re-align the tripod and head with the ever-changing topography of the floor and terrain.

Further, the apparatus may include an electronic video stabilizer (or camera gimbal) with a tripod. Further, a coupling of the gimbal and tripod may be made with a quick release that allows instantaneous de-coupling of the gimbal from the tripod for handheld use, then quickly re-mounting the gimbal to the photography tripod. Further, the apparatus eliminates the need to level or align the camera to the horizon, as it is achieved automatically through the gimbal functions.

An operator simply sets the camera in a room and snaps the photo, then decouples the gimbal portion to immediately begin recording stabilized footage. After completing the video portion, the operator simply re-attaches the gimbal to the tripod and moves on to the next room or area to repeat the process. The apparatus eliminates the need for any other input from the operator and therefore reduces the time and skill level requirement exponentially.

FIG. 1 is an illustration of an online platform 100 consistent with various embodiments of the present disclosure. By way of non-limiting example, the online platform 100 may be hosted on a centralized server 102, such as, for example, a cloud computing service. The centralized server 102 may communicate with other network entities, such as, for example, a mobile device 106 (such as a smartphone, a laptop, a tablet computer etc.), other electronic devices 110 (such as desktop computers, server computers etc.), databases 114, sensors 116, and an apparatus 118 (such as an apparatus for facilitating providing levelling) over a communication network 104, such as, but not limited to, the Internet. Further, users of the online platform 100 may include relevant parties such as, but not limited to, end-users, administrators, service providers, service consumers and so on. Accordingly, in some instances, electronic devices operated by the one or more relevant parties may be in communication with the platform.

A user 112, such as the one or more relevant parties, may access online platform 100 through a web based software application or browser. The web based software application may be embodied as, for example, but not be limited to, a website, a web application, a desktop application, and a mobile application compatible with a computing device 200.

Figure 2:
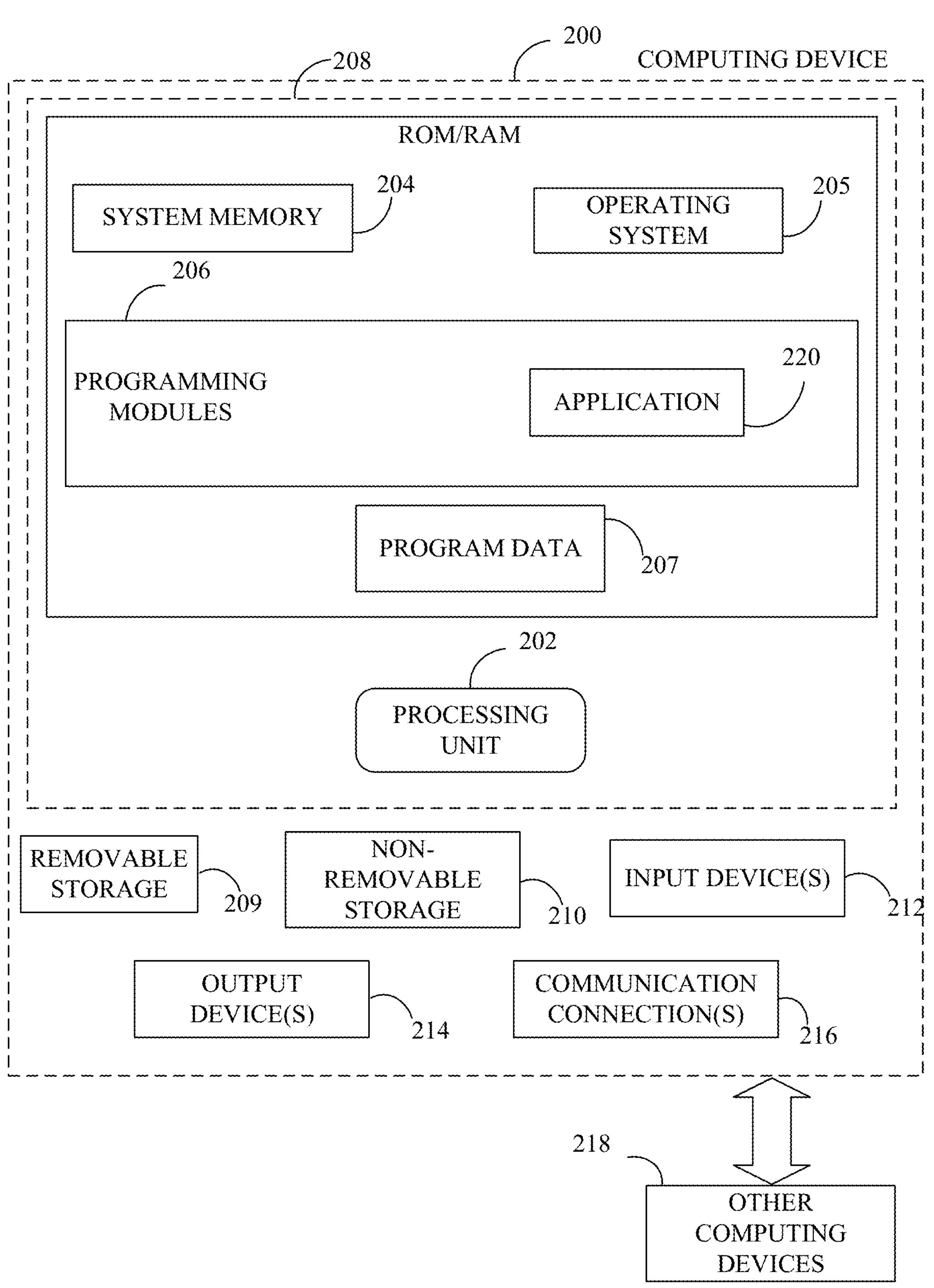
FIG. 2 is a block diagram of a computing device 200 for implementing the methods disclosed herein, in accordance with some embodiments.

With reference to FIG. 2, a system consistent with an embodiment of the disclosure may include a computing device or cloud service, such as computing device 200. In a basic configuration, computing device 200 may include at least one processing unit 202 and a system memory 204. Depending on the configuration and type of computing device, system memory 204 may comprise, but is not limited to, volatile (e.g. random-access memory (RAM)), non-volatile (e.g. read-only memory (ROM)), flash memory, or any combination. System memory 204 may include operating system 205, one or more programming modules 206, and may include a program data 207. Operating system 205, for example, may be suitable for controlling computing device 200's operation. In one embodiment, programming modules 206 may include image-processing module, machine learning module. Furthermore, embodiments of the disclosure may be practiced in conjunction with a graphics library, other operating systems, or any other application program and is not limited to any particular application or system. This basic configuration is illustrated in FIG. 2 by those components within a dashed line 208.

Computing device 200 may have additional features or functionality. For example, computing device 200 may also include additional data storage devices (removable and/or non-removable) such as, for example, magnetic disks, optical disks, or tape. Such additional storage is illustrated in FIG. 2 by a removable storage 209 and a non-removable storage 210. Computer storage media may include volatile and non-volatile, removable and non-removable media implemented in any method or technology for storage of information, such as computer-readable instructions, data structures, program modules, or other data. System memory 204, removable storage 209, and non-removable storage 210 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 200. Any such computer storage media may be part of device 200. Computing device 200 may also have input device(s) 212 such as a keyboard, a mouse, a pen, a sound input device, a touch input device, a location sensor, a camera, a biometric sensor, etc. Output device(s) 214 such as a display, speakers, a printer, etc. may also be included. The aforementioned devices are examples and others may be used.

Computing device 200 may also contain a communication connection 216 that may allow device 200 to communicate with other computing devices 218, such as over a network in a distributed computing environment, for example, an intranet or the Internet. Communication connection 216 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 204, including operating system 205. While executing on processing unit 202, programming modules 206 (e.g., application 220 such as a media player) may perform processes including, for example, one or more stages of methods, algorithms, systems, applications, servers, databases as described above. The aforementioned process is an example, and processing unit 202 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Figure 3:
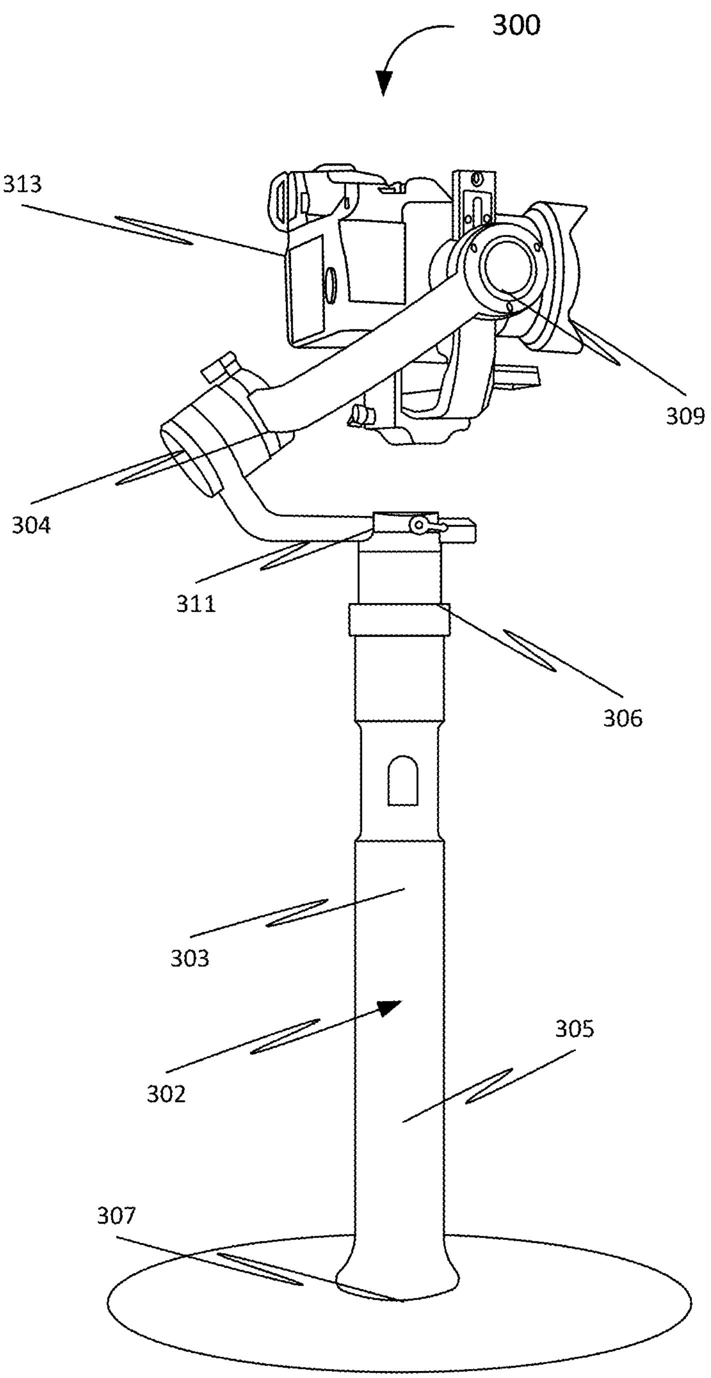
FIG. 3 illustrates an apparatus 300 for providing levelling, in accordance with some embodiments.

FIG. 3 illustrates an apparatus 300 for providing levelling, in accordance with some embodiments.

Further, the apparatus 300 may include a stand 302 which may be configured to be stably placed on a surface. Further, the stand 302 may include a head portion 303, a stem portion 305, and a base portion 307. Further, the stem portion 305 may be connected to each of the head portion 303 and the base portion 307. Further, the base portion 307 may be in physical contact with the surface while the stand 302 may be placed on the surface. Further, the apparatus 300 may include a gimbal 304 comprising a holder 309 and a handle 311. Further, the holder 309 may be configured to hold an equipment 313 and the handle 311 may be configured to be held by a user. For instance, the handle 311 may be configured to be held using one hand of the user. Further, the gimbal 304 may be configured to maintain an orientation of the holder 309 irrespective of an orientation of the handle 311 of the gimbal 304 in relation to a reference. For instance, the gimbal 304 may maintain a horizontal orientation of the holder in relation to horizon in spite of any movement, such as a tilting or a rotating, of the handle 311. Further, the apparatus 300 may include a coupling mechanism 306 connected to the head portion 303. Further, the coupling mechanism 306 may be configured to detachably attach the handle 311 of the gimbal 304 to the head portion 303 of the stand 302.

Figure 4:
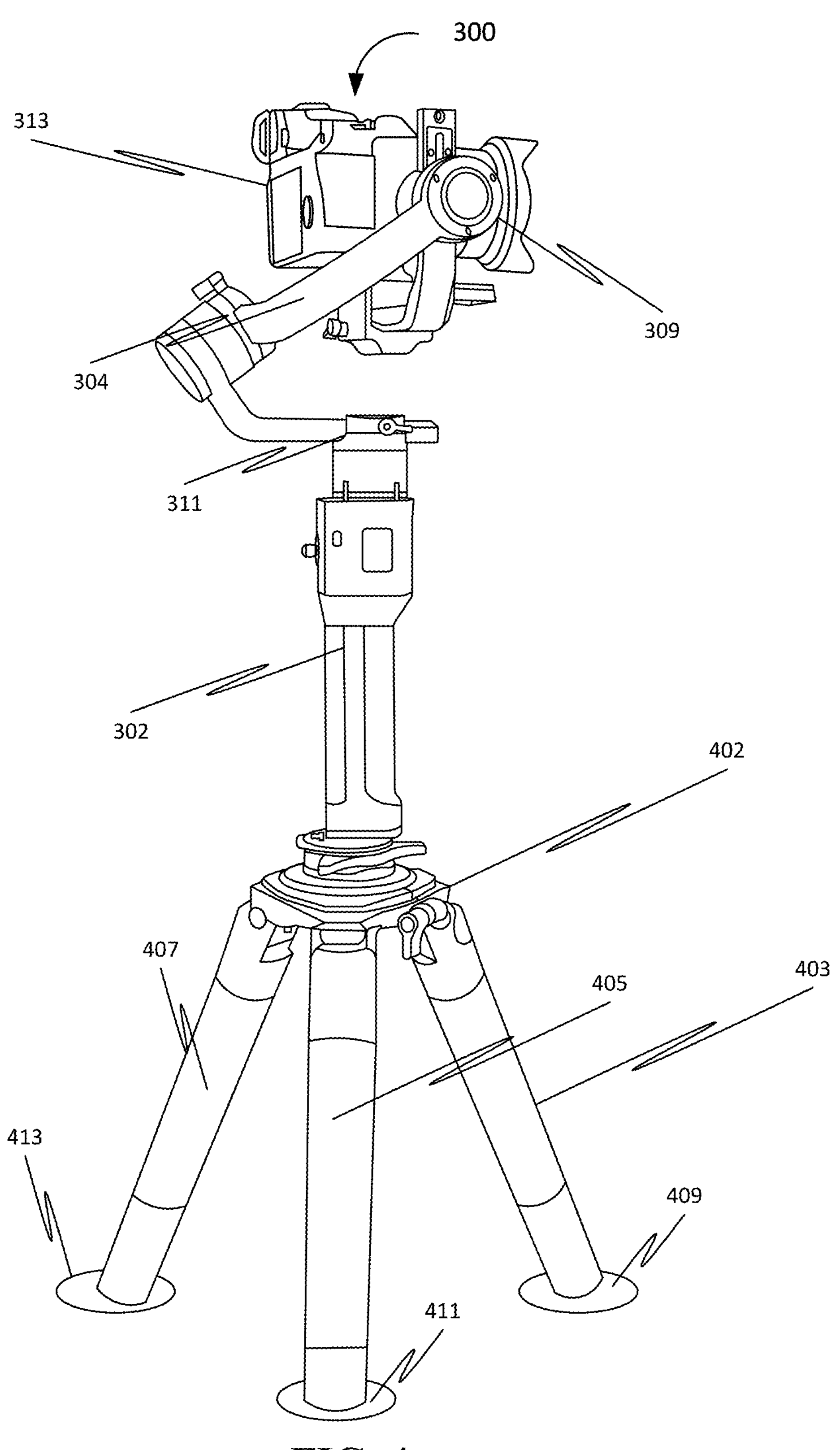
FIG. 4 illustrates the stand 302 included in the apparatus 300 for providing levelling, in accordance with some embodiments.

In some embodiments, the stem portion 305 includes two or more legs 403, 405, and 407 as illustrated in FIG. 4. Accordingly, by using two or more legs, the apparatus 300 may be stably placed on the surface with a smaller foot-print as compared to using a single leg. Accordingly, in some embodiments, the stand 302 may be a tripod 402.

Figure 5:
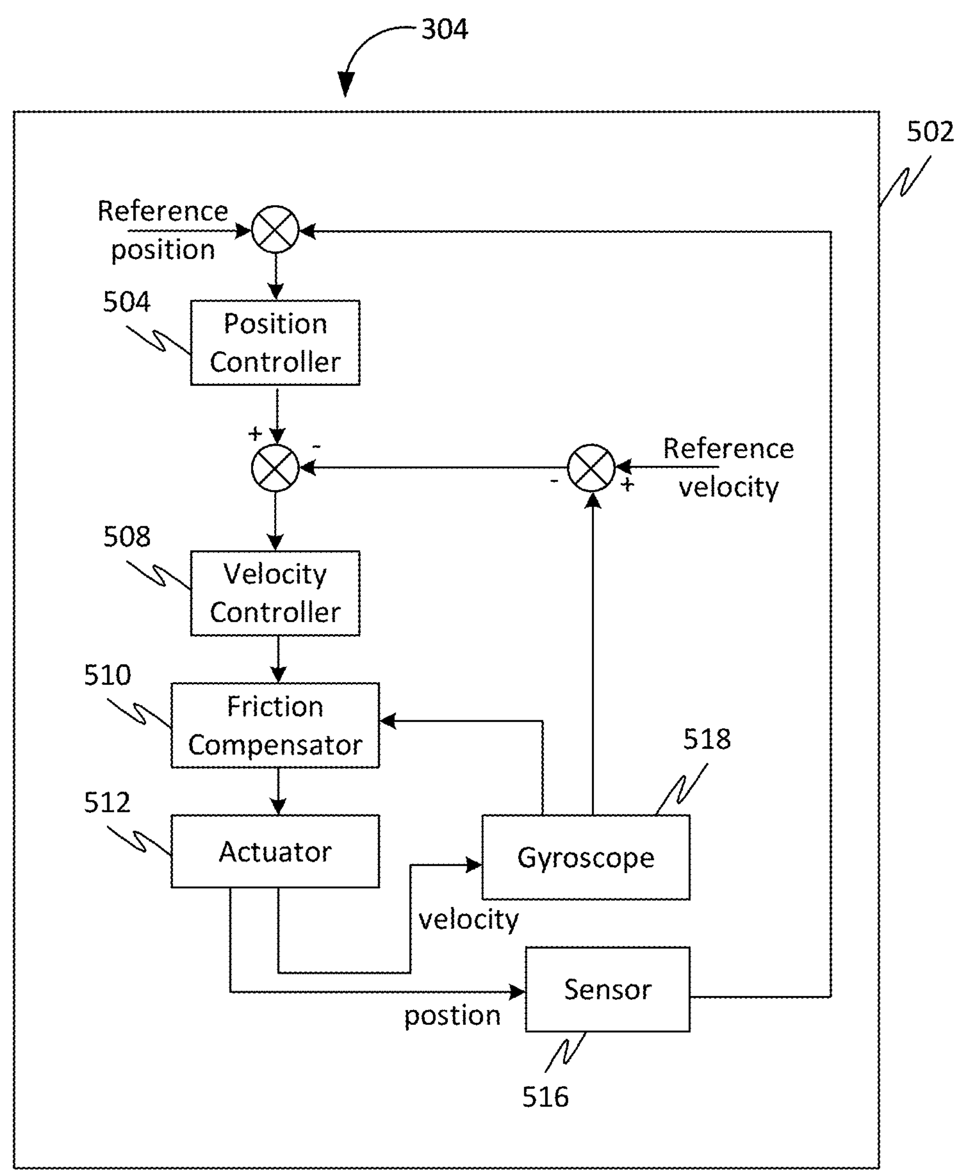
FIG. 5 illustrates a block diagram of the gimbal 304 included in the apparatus 300 for providing levelling, in accordance with some embodiments.

FIG. 5 illustrates a block diagram of the gimbal 304 included in the apparatus 300 for providing levelling, in accordance with some embodiments.

In some embodiments, the gimbal 304 includes an electronic gimbal 502. Accordingly, the electronic gimbal 502 may include a position controller 504 that determine a desired position of the electronic gimbal 502 based on an input reference and feedback from a sensor 516. Further, the electronic gimbal 502 may include a velocity controller 508 that regulates a speed at which the electronic gimbal 502 moves to reach the desired position. Further, the electronic gimbal 502 may include a friction compensator 510 that adjusts control signals to account for friction in moving parts of the electronic gimbal 502, ensuring accurate positioning. Further, the electronic gimbal 502 may include an actuator 512 comprising a physical device (such as a motor) that moves the electronic gimbal 502 based on the control signals from the position and velocity controller 508. Further, the electronic gimbal 502 may include a gyroscope (or gyro) 518 that measures the angular rate of the electronic gimbal 502, providing feedback to the velocity controller 508 to maintain stable orientation. Further, the gyro 518 may be used for measuring or maintaining orientation and angular velocity. Further, the electronic gimbal 502 may include the sensor 516 that provides precise measurements of the position of the electronic gimbal 502 that may be used as feedback for the position controller 504.

Figure 6:
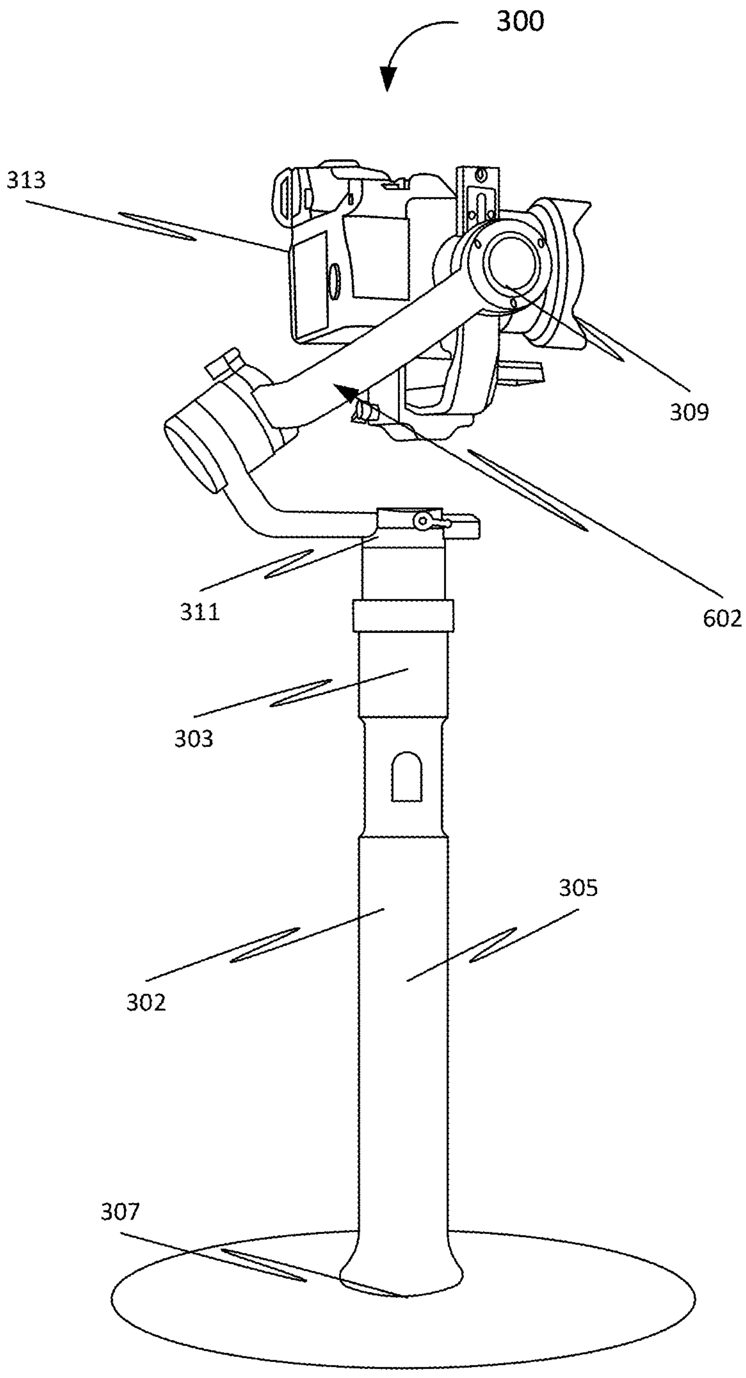
FIG. 6 illustrates the gimbal 304 included in the apparatus 300 for providing levelling, in accordance with some embodiments.

FIG. 6 illustrates the gimbal 304 included in the apparatus 300 for providing levelling, in accordance with some embodiments.

In some embodiments, the gimbal 304 includes a mechanical gimbal 602. Accordingly, the mechanical gimbal 602 may include a mounting plate to securely attach a mobile phone or camera, motors to provide stabilization and counteract movements, and ball joints (or hinges) to allow smooth rotation and adjustment while mounted on the tripod 402.

Figure 7:
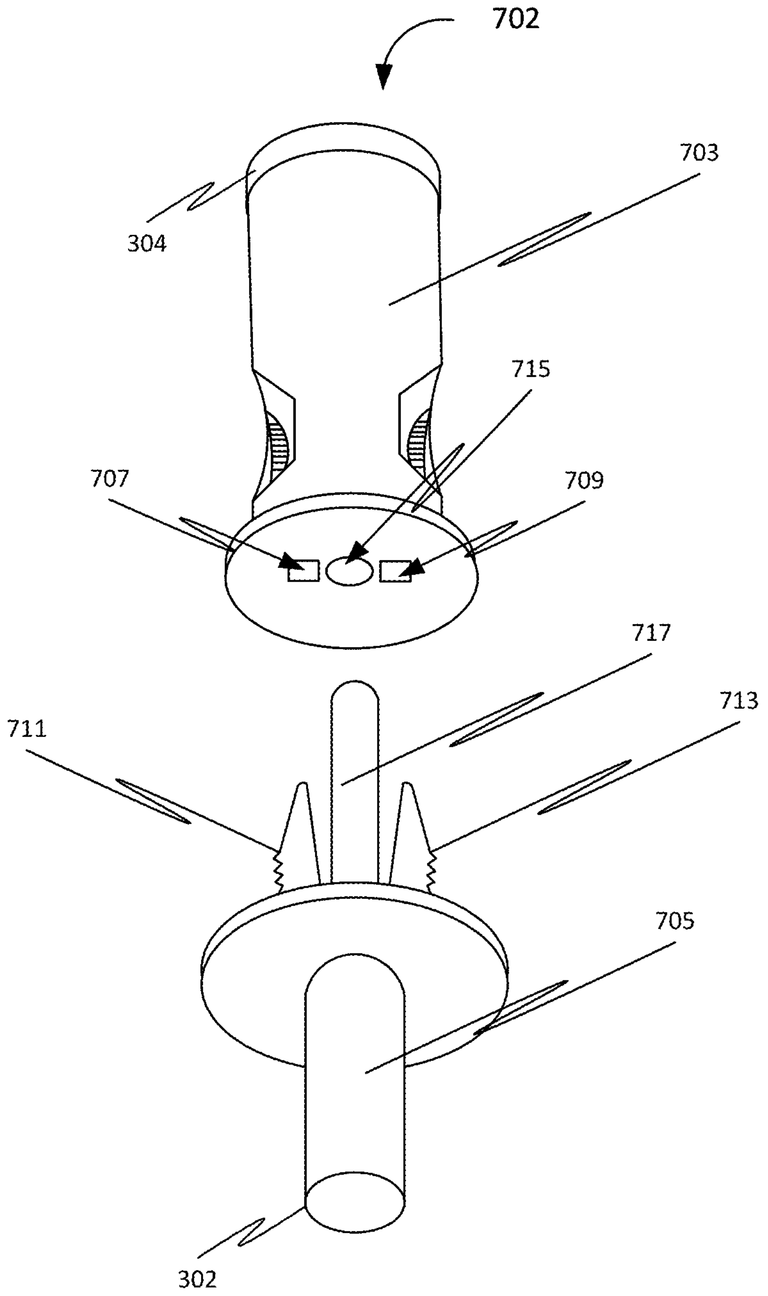
FIG. 7 illustrates the coupling mechanism 306 included in the apparatus 300 for providing levelling, in accordance with some embodiments.

FIG. 7 illustrates the coupling mechanism 306 included in the apparatus 300 for providing levelling, in accordance with some embodiments.

In some embodiments, the coupling mechanism 306 includes a quick release coupling mechanism 702. Accordingly, the quick release coupling mechanism 702 may be configured for mounting and dismounting the gimbal 304 onto the stand 302. Further, the quick release coupling mechanism 702 may include a primary element 703 attached to the gimbal 304 and a secondary element 705 configured to be secured to the stand 302. The primary element 703 may include a plurality of multiple docking points 707 and 709 that align with a plurality of projections 711 and 713 on the secondary element 705. Further, the plurality of projections 711 and 713 may include a plurality of bayonet features. Further, the plurality of projections may be resiliently flexible, expanding outward upon connection to securely engage with an indentation in the primary element 703, ensuring a firm interlock. Further, the plurality of projections may serve as a rigid guide during connection. Additionally, the primary element 703 may include a polygonal recess 715 that matches a corresponding protrusion 717 on the secondary element 705, providing resistance against torsional stress. The quick-release coupling mechanism 702 may facilitate swift attachment and detachment of the gimbal 304 onto the stand 302.

In some embodiments, the equipment 313 includes a content capturing device. Further, the content capturing device may include a smartphone, a tablet, a mobile, a laptop, a camera, a surveying device, a laser pointer, a detection unit etc.

In some embodiments, the apparatus 300 may be used for capturing each of a still image and a stabilized video of a real-estate property. Further, the content capturing device may include a digital camera. Further, the still image may be captured while the digital camera is held by the holder 309 of the gimbal 304 and the handle 311 of the gimbal 304 is attached to the head portion 303 of the stand 302. Further, the stabilized video may be captured while the digital camera is held by the holder 309 of the gimbal 304 and the handle 311 of the gimbal 304 is detached from the head portion 303 of the stand 302. For example, subsequent to detaching the gimbal 304, the user may hold the handle 311 and move around the real-estate property while capturing different portions of the real-estate property and thus resulting in the generation of the stabilized video.

In some embodiments, the surface may be a floor of a real-estate property. Further, the gimbal 304 may be configured to maintain a horizontal orientation of the digital camera in relation to horizon. Further, the horizontal orientation may be maintained independent of a levelness of the surface. For example, even if the surface exhibits an uneven characteristic such as a slope, bumps and so on, and even if the stand itself is tilted as a result, the gimbal 304 may ensure that the horizontal orientation of the digital camera is nonetheless maintained to obtain a proper still image of the real-estate property.

In some embodiments, the digital camera may be configured to be remotely controlled by an external device.

Further, the present disclosure also provides an apparatus 300 for providing levelling, in accordance with some embodiments. Further, the apparatus 300 may include a tripod 402 which may be configured to be stably placed on a surface. Further, the tripod 402 includes a head portion 303, a stem portion 305, and a base portion 307. Further, the stem portion 305 may be connected to each of the head portion 303 and the base portion 307. Further, the base portion 307 may be in physical contact with the surface while the stand 302 may be placed on the surface. Further, the stem portion 305 includes three legs 403, 405, and 407 and the base portion 307 includes three feet 409, 411, and 413 corresponding to the three legs 403, 405, and 407. Further, the apparatus 300 may include an electronic gimbal 502 comprising a holder 309 and a handle 311. Further, the holder 309 may be configured to hold an equipment 313 and the handle 311 may be configured to be held by a user. Further, the electronic gimbal 502 may be configured to maintain an orientation of the holder 309 irrespective of an orientation of the handle 311 of the electronic gimbal 502 in relation to a reference. Further, the apparatus 300 may include a quick release coupling mechanism 702 connected to the head portion 303. Further, the quick release coupling mechanism 702 may be configured to detachably attach the handle 311 of the electronic gimbal 502 to the head portion 303 of the stand 302. Further, the quick release coupling mechanism 702 may be configured to perform each of attaching and detaching based on a user action on the quick release coupling mechanism 702. Further, the user action may be performable under one second.

In some embodiments, the quick release coupling mechanism 702 may be configured for mounting and dismounting the gimbal 304 onto the stand 302. Further, the quick release coupling mechanism 702 may include a primary element 703 attached to the gimbal 304 and a secondary element 705 configured to be secured to the stand 302. The primary element 703 may include a plurality of multiple docking points 707 and 709 that align with a plurality of projections 711 and 713 (such as bayonet features) on the secondary element 705. Further, the plurality of projections may be resiliently flexible, expanding outward upon connection to securely engage with an indentation in the primary element 703, ensuring a firm interlock. Further, the plurality of projections may serve as a rigid guide during connection. Additionally, the primary element 703 may include a polygonal recess 715 that matches a corresponding protrusion 717 on the secondary element 705, providing resistance against torsional stress. The quick-release coupling mechanism 702 may facilitate swift attachment and detachment of the gimbal 304 onto the stand 302.

In some embodiments, the electronic gimbal 502 may include a position controller 504 that determine a desired position of the electronic gimbal 502 based on an input reference and feedback from a sensor 516. Further, the electronic gimbal 502 may include a velocity controller 508 that regulates a speed at which the electronic gimbal 502 moves to reach the desired position. Further, the electronic gimbal 502 may include a friction compensator 510 that adjusts control signals to account for friction in moving parts of the electronic gimbal 502, ensuring accurate positioning. Further, the electronic gimbal 502 may include an actuator 512 comprising a physical device (such as a motor) that moves the electronic gimbal 502 based on the control signals from the position and velocity controller 508. Further, the electronic gimbal 502 may include a gyro 518 that measures the angular rate of the electronic gimbal 502, providing feedback to the velocity controller 508 to maintain stable motion. Further, the electronic gimbal 502 may include the sensor 516 that provides precise measurements of the position of the electronic gimbal 502 that may be used as feedback for the position controller 504.

In some embodiments, the equipment 313 includes a content capturing device.

In some embodiments, the apparatus 300 may be used for capturing each of a still image and a stabilized video of a real-estate property. Further, the content capturing device includes a digital camera. Further, the still image may be captured while the digital camera may be held by the holder 309 of the electronic gimbal 502 and the handle 311 of the electronic gimbal 502 may be attached to the head portion 303 of the tripod 402. Further, the stabilized video may be captured while the digital camera may be held by the holder 309 of the electronic gimbal 502 and the handle 311 of the electronic gimbal 502 may be detached from the head portion 303 of the tripod 402.

In some embodiments, the surface may be a floor of a real-estate property. Further, the electronic gimbal 502 may be configured to maintain a horizontal orientation of the digital camera in relation to horizon. Further, the horizontal orientation may be maintained independent of a levelness of the surface.

In some embodiments, the digital camera may be configured to be remotely controlled by an external device. Further, the external device may include a smartphone, a tablet, a laptop, etc.

Further, the present disclosure also provides an apparatus 300 for providing levelling, in accordance with some embodiments. Further, the apparatus 300 may include a stand 302 which may be configured to be stably placed on a surface. Further, the stand 302 includes a head portion 303, a stem portion 305, and a base portion 307. Further, the stem portion 305 may be connected to each of the head portion 303 and the base portion 307. Further, the base portion 307 may be in physical contact with the surface while the stand 302 may be placed on the surface. Further, the apparatus 300 may include a gimbal 304 comprising a holder 309 and a handle 311. Further, the holder 309 may be configured to hold a digital camera and the handle 311 may be configured to be held by a user. Further, the gimbal 304 may be configured to maintain an orientation of the holder 309 irrespective of an orientation of the handle 311 of the gimbal 304 in relation to a reference. Further, the apparatus 300 may include a quick release coupling mechanism 702 connected to the head portion 303. Further, the quick release coupling mechanism 702 may be configured to detachably attach the handle 311 of the gimbal 304 to the head portion 303 of the stand 302. Further, the quick release coupling mechanism 702 may be configured to perform each of attaching and detaching based on a user action on the quick release coupling mechanism 702. Further, the user action may be performable under one second. In some embodiments, the quick release coupling mechanism 702 may be so configured that the user action may be performable under half or quarter of a second.

In some embodiments, the quick release coupling mechanism 702 may be configured for mounting and dismounting the gimbal 304 onto the stand 302. Further, the quick release coupling mechanism 702 may include a primary element 703 attached to the gimbal 304 and a secondary element 705 configured to be secured to the stand 302. The primary element 703 may include a plurality of multiple docking points 707 and 709 that align with a plurality of projections 711 and 713 (such as bayonet features) on the secondary element 705. Further, the plurality of projections may be resiliently flexible, expanding outward upon connection to securely engage with an indentation in the primary element 703, ensuring a firm interlock. Further, the plurality of projections may serve as a rigid guide during connection. Additionally, the primary element 703 may include a polygonal recess 715 that matches a corresponding protrusion 717 on the secondary element 705, providing resistance against torsional stress. The quick-release coupling mechanism 702 may facilitate swift attachment and detachment of the gimbal 304 onto the stand 302.

In some embodiments, the apparatus 300 may be used for capturing each of a still image and a stabilized video of a real-estate property. Further, the still image may be captured while the digital camera is held by the holder 309 of the gimbal 304 and the handle 311 of the gimbal 304 is attached to the head portion 303 of the stand 302. Further, the stabilized video may be captured while the digital camera is held by the holder 309 of the gimbal 304 and the handle 311 of the gimbal 304 is detached from the head portion 303 of the stand 302.

In some embodiments, the surface may be a floor of a real-estate property. Further, the gimbal 304 may be configured to maintain a horizontal orientation of the digital camera in relation to horizon. Further, the horizontal orientation may be maintained independent of a levelness of the surface.

In some embodiments, the digital camera may be configured to be remotely controlled by an external device.

In some embodiments, the stand 302 may be the tripod 402.

Figure 8:
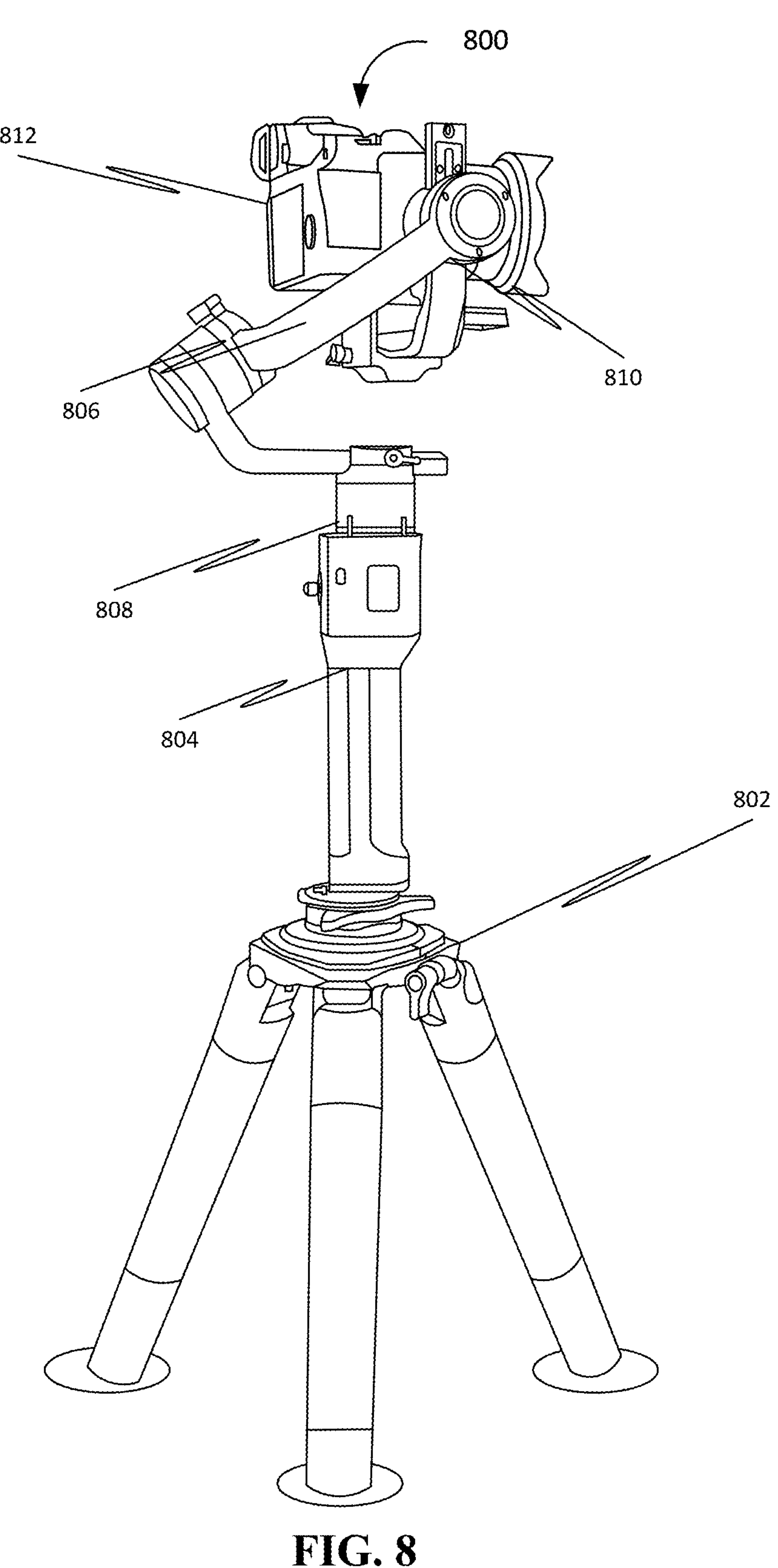
FIG. 8 illustrates an apparatus 800 for facilitating optimal photography and videography, in accordance with some embodiments.

FIG. 8 illustrates an apparatus 800 for facilitating optimal photography and videography, in accordance with some embodiments. Accordingly, the apparatus 800 may include a tripod 802. Further, the tripod 802 may include a tripod attachment component 804. Further, the apparatus may include a gimbal 806. Further, the gimbal 806 may include a gimbal attachment component 808. Further, the gimbal attachment component 808 and the tripod attachment component 804 may be disengagedly engageable. Further, the gimbal 806 may be removably mountable on the tripod. Further, the gimbal 806 may include a camera device mount 810 configured for mountably receiving a camera device 812. Further, the apparatus 800 may eliminate re-balancing and provide stabilization for photography and videography. Further, the apparatus 800 allows a user to place the tripod 802 on a horizontal surface. Further, the gimbal 806 automatically achieves a correct horizon perspective. Further, the user may remotely capture a photograph and quickly move to a new location. Further, the user may unmount the gimbal 806 from the tripod 802 with the camera device 812 mounted on the gimbal 806.

Further, in some embodiments, the tripod attachment component 804 may be removably insertable in the gimbal attachment component 808.

Figure 9:
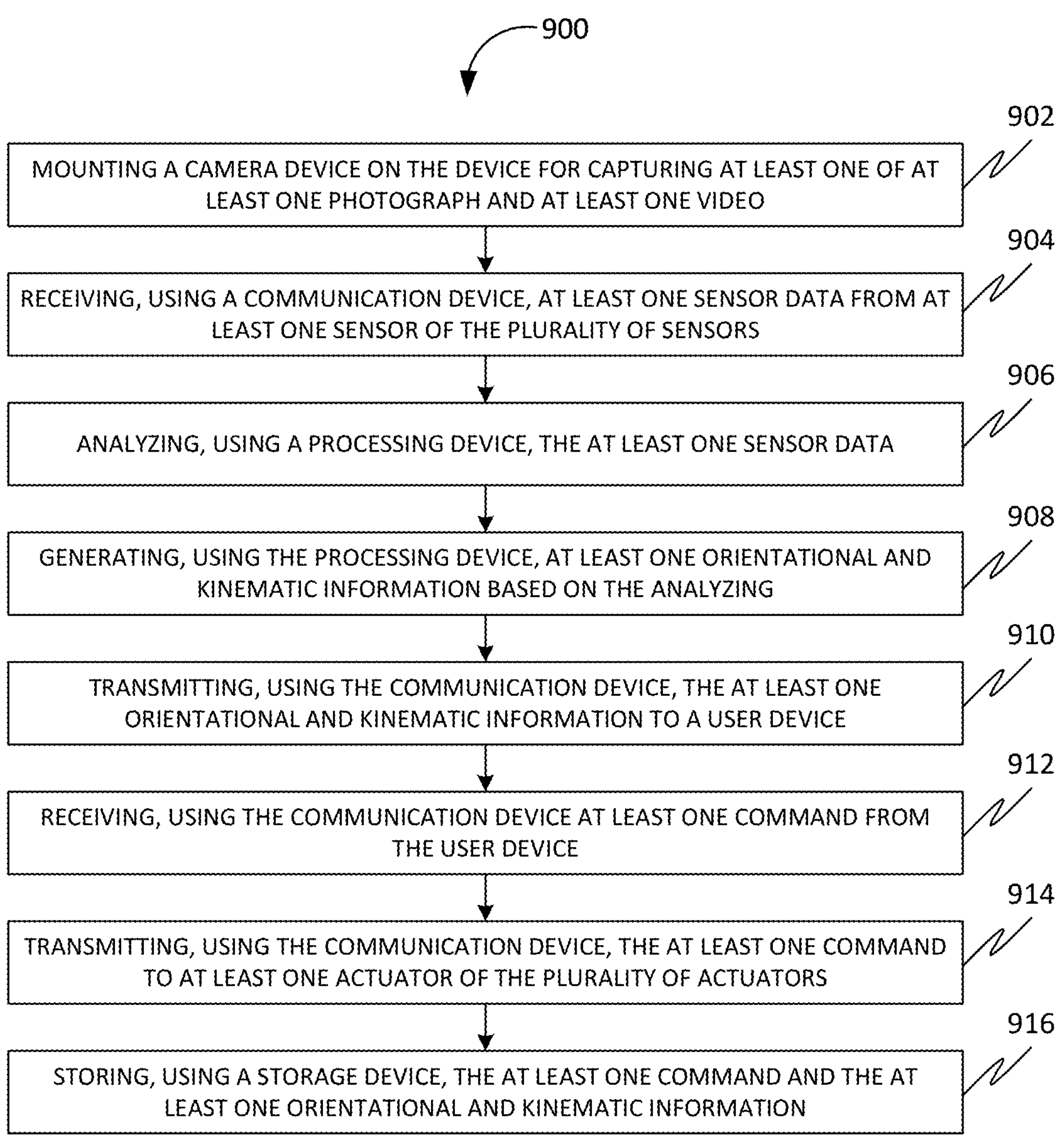
FIG. 9 is a flowchart of a method 900 for facilitating optimal photography and videography, in accordance with some embodiments.

FIG. 9 is a flowchart of a method 900 for facilitating optimal photography and videography, in accordance with some embodiments.

Further, at 902, the method 900 may include a step of mounting a camera device on the device for capturing at least one of at least one photograph and at least one video. Further, the device may include a plurality of sensors and a plurality of actuators. Further, the plurality of sensors may include at least one accelerometer, at least one gyroscope, at least one position sensor, etc.

Further, at 904, the method 900 may include a step of receiving, using a communication device, at least one sensor data from at least one sensor of the plurality of sensors. Further, the at least one sensor data may indicate at least one of a first orientation and a first kinematic state of the camera device.

Further, at 906, the method 900 may include a step of analyzing, using a processing device, the at least one sensor data.

Further, at 908, the method 900 may include a step of generating, using the processing device, at least one orientational and kinematic information based on the analyzing. Further, the at least one orientational and kinematic information may be associated with the camera device.

Further, at 910, the method 900 may include a step of transmitting, using the communication device, the at least one orientational and kinematic information to a user device. Further, the user device may be associated with a user of the device. Further, the user device may include but may not be limited to a smartphone, a laptop, a desktop, a smartwatch, etc.

Further, at 912, the method 900 may include a step of receiving, using the communication device, at least one command from the user device. Further, the user device may be configured for generating the at least one command based on the at least one orientational and kinematic information.

Further, at 914, the method 900 may include a step of transmitting, using the communication device, the at least one command to at least one actuator of the plurality of actuators. Further, the at least one actuator may be configured for transitioning the camera device from the first orientation and the first kinematic state to a second orientation and a second kinematic state based on the at least one command.

Further, at 916, the method 900 may include a step of storing, using a storage device, the at least one command and the at least one orientational and kinematic information.

Figure 10:
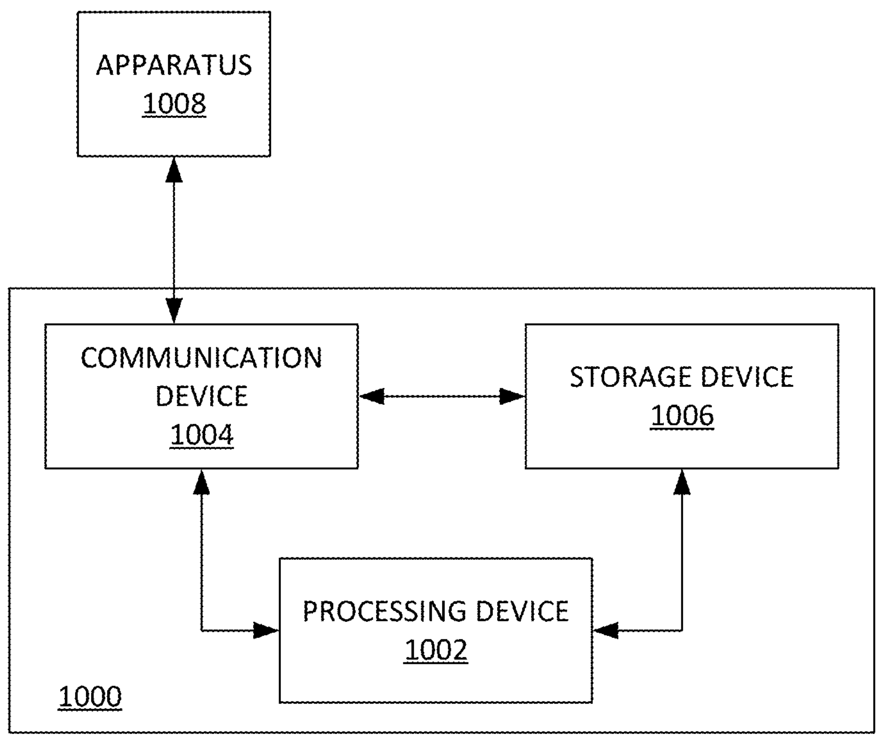
FIG. 10 is a block diagram of a system 1000 for facilitating optimal photography and videography, in accordance with some embodiments.

FIG. 10 is a block diagram of a system 1000 for facilitating optimal photography and videography, in accordance with some embodiments. Accordingly, the system 1000 may include a processing device 1002, a communication device 1004, and a storage device 1006. Further, the communication device 1004 may be communicatively coupled with the processing device 1002. Further, the communication device 1004 may be communicatively coupled with the storage device 1006. Further, the communication device 1004 may be communicatively coupled with an apparatus 1008 (such as the apparatus 300). Further, the storage device 1006 may be communicatively coupled with the processing device 1002.

Further, a camera device may be mountable on the device for capturing at least one of at least one photograph and at least one video. Further, the device may include a plurality of sensors and a plurality of actuators. Further, the plurality of sensors may include at least one accelerometer, at least one gyroscope, at least one position sensor, etc.

Further, the communication device 1004 may be configured for receiving at least one sensor data from at least one sensor of the plurality of sensors. Further, the at least one sensor data may indicate at least one of a first orientation and a first kinematic state of the camera device. Further, the communication device 1004 may be configured for transmitting at least one orientational and kinematic information to a user device. Further, the user device may be associated with a user of the device. Further, the user device may include but may not be limited to a smartphone, a laptop, a desktop, a smartwatch, etc. Further, the communication device 1004 may be configured for receiving at least one command from the user device. Further, the user device may be configured for generating the at least one command based on the at least one orientational and kinematic information. Further, the communication device 1004 may be configured for transmitting the at least one command to at least one actuator of the plurality of actuators. Further, the at least one actuator may be configured for transitioning the camera device from the first orientation and the first kinematic state to a second orientation and a second kinematic state based on the at least one command.

Further, the processing device 1002 may be configured for analyzing the at least one sensor data. Further, the processing device 1002 may be configured for generating the at least one orientational and kinematic information based on the analyzing. Further, the at least one orientational and kinematic information may be associated with the camera device.

Further, the storage device 1006 may be configured for storing the at least one command and the at least one orientational and kinematic information.

Although the invention has been explained in relation to its preferred embodiment, it is to be understood that many other possible modifications and variations can be made without departing from the spirit and scope of the invention as hereinafter claimed.

The invention claimed is:

1. An apparatus for providing levelling, the apparatus comprising:

a stand configured to be stably placed on a surface, wherein the stand comprises a head portion, a stem portion, and a base portion, wherein the stem portion is connected to each of the head portion and the base portion, wherein the base portion is in physical contact with the surface while the stand is placed on the surface, wherein the coupling mechanism is connected to the head portion and comprises a secondary element secured to the head portion;

a gimbal comprising a holder and a handle, wherein the holder is configured to hold an equipment and the handle is configured to be held by a user, wherein the gimbal is configured to maintain an orientation of the holder irrespective of an orientation of the handle of the gimbal in relation to a reference, wherein the reference is a horizon and the orientation is a horizontal orientation; and a coupling mechanism connected to the head portion, wherein the coupling mechanism is configured to detachably attach the handle of the gimbal to the head portion of the stand, wherein the coupling mechanism comprises a quick release coupling mechanism including a primary element attached to the gimbal and a secondary element secured to the stand.

2. The apparatus of claim 1, wherein the stem portion comprises a plurality of legs.

3. The apparatus of claim 1, wherein the stand comprises a tripod.

4. The apparatus of claim 1, wherein the gimbal comprises an electronic gimbal.

5. The apparatus of claim 1, wherein the gimbal comprises a mechanical gimbal.

6. The apparatus of claim 1, wherein the coupling mechanism comprises a quick release coupling mechanism including a primary element attached to the gimbal and a secondary element secured to the stand.

7. The apparatus of claim 1, wherein the equipment comprises a content capturing device.

8. The apparatus of claim 7 being used for capturing each of a still image and a stabilized video of a real-estate property, wherein the content capturing device comprises a digital camera, wherein the still image is captured while the digital camera is held by the holder of the gimbal and the handle of the gimbal is attached to the head portion of the stand, wherein the stabilized video is captured while the digital camera is held by the holder of the gimbal and the handle of the gimbal is detached from the head portion of the stand, wherein the coupling mechanism comprises a quick release coupling mechanism configured to perform each of attaching and detaching based on a user action performable under one second.

9. The apparatus of claim 6, wherein the surface is a floor of a real-estate property, wherein the gimbal is configured to maintain a horizontal orientation of the digital camera in relation to horizon, wherein the horizontal orientation is maintained independent of a levelness of the surface while the stand is tilted relative to the horizon due to unevenness of the floor.

10. The apparatus of claim 9, wherein the digital camera is configured to be remotely controlled by an external device.

11. An apparatus for providing levelling, the apparatus comprising:

a tripod configured to be stably placed on a surface, wherein the tripod comprises a head portion, a stem portion, and a base portion, wherein the stem portion is connected to each of the head portion and the base portion, wherein the base portion is in physical contact with the surface while the stand is placed on the surface, wherein the stem portion comprises three legs and the base portion comprises three feet corresponding to the three legs;

an electronic gimbal comprising a holder and a handle, wherein the holder is configured to hold an equipment and the handle is configured to be held by a user, wherein the electronic gimbal is configured to maintain an orientation of the holder irrespective of an orientation of the handle of the electronic gimbal in relation to a reference; and a quick release coupling mechanism connected to the head portion, wherein the quick release coupling mechanism is configured to detachably attach the handle of the electronic gimbal to the head portion of the stand, wherein the quick release coupling mechanism is configured to perform each of attaching and detaching based on a user action on the quick release coupling mechanism, wherein the user action is performable under one second, wherein the quick release coupling mechanism includes a primary element attached to the electronic gimbal and a secondary element secured to the stand, and wherein the primary element includes a polygonal recess that matches a corresponding protrusion on the secondary element to resist torsional stress.

12. The apparatus of claim 11, wherein the equipment comprises a content capturing device.

13. The apparatus of claim 12 being used for capturing each of a still image and a stabilized video of a real-estate property, wherein the content capturing device comprises a digital camera, wherein the still image is captured while the digital camera is held by the holder of the electronic gimbal and the handle of the electronic gimbal is attached to the head portion of the tripod, wherein the stabilized video is captured while the digital camera is held by the holder of the electronic gimbal and the handle of the electronic gimbal is detached from the head portion of the tripod.

14. The apparatus of claim 13, wherein the surface is a floor of a real-estate property, wherein the electronic gimbal is configured to maintain a horizontal orientation of the digital camera in relation to horizon, wherein the horizontal orientation is maintained independent of a levelness of the surface even when the tripod is tilted relative to the horizon due to unevenness of the floor.

15. The apparatus of claim 13, wherein the digital camera is configured to be remotely controlled by an external device.

16. An apparatus for providing levelling, the apparatus comprising:

a stand configured to be stably placed on a surface, wherein the stand comprises a head portion, a stem portion, and a base portion, wherein the stem portion is connected to each of the head portion and the base portion, wherein the base portion is in physical contact with the surface while the stand is placed on the surface;

a gimbal comprising a holder and a handle, wherein the holder is configured to hold a digital camera and the handle is configured to be held by a user, wherein the gimbal is configured to maintain an orientation of the holder irrespective of an orientation of the handle of the gimbal in relation to a reference, wherein the reference is a horizon and the orientation is a horizontal orientation; and a quick release coupling mechanism connected to the head portion, wherein the quick release coupling mechanism is configured to detachably attach the handle of the gimbal to the head portion of the stand, wherein the quick release coupling mechanism is configured to perform each of attaching and detaching based on a user action on the quick release coupling mechanism, wherein the user action is performable under one second, wherein the quick release coupling mechanism includes a plurality of docking points that align with a plurality of projections including bayonet features.

17. The apparatus of claim 16 being used for capturing each of a still image and a stabilized video of a real-estate property, wherein the still image is captured while the digital camera is held by the holder of the gimbal and the handle of the gimbal is attached to the head portion of the stand, wherein the stabilized video is captured while the digital camera is held by the holder of the gimbal and the handle of the gimbal is detached from the head portion of the stand.

18. The apparatus of claim 17, wherein the surface is a floor of a real-estate property, wherein the gimbal is configured to maintain a horizontal orientation of the digital camera in relation to horizon, wherein the horizontal orientation is maintained independent of a levelness of the surface.

19. The apparatus of claim 17, wherein the digital camera is configured to be remotely controlled by an external device.

20. The apparatus of claim 17, wherein the stand comprises a tripod.

* * * * *